April 28, 1964 R. NEUSCHOTZ 3,130,765
SELF-ALIGNING THREADED INSERT WITH RESILIENT RETAINING RING
Filed April 14, 1959 3 Sheets-Sheet 1
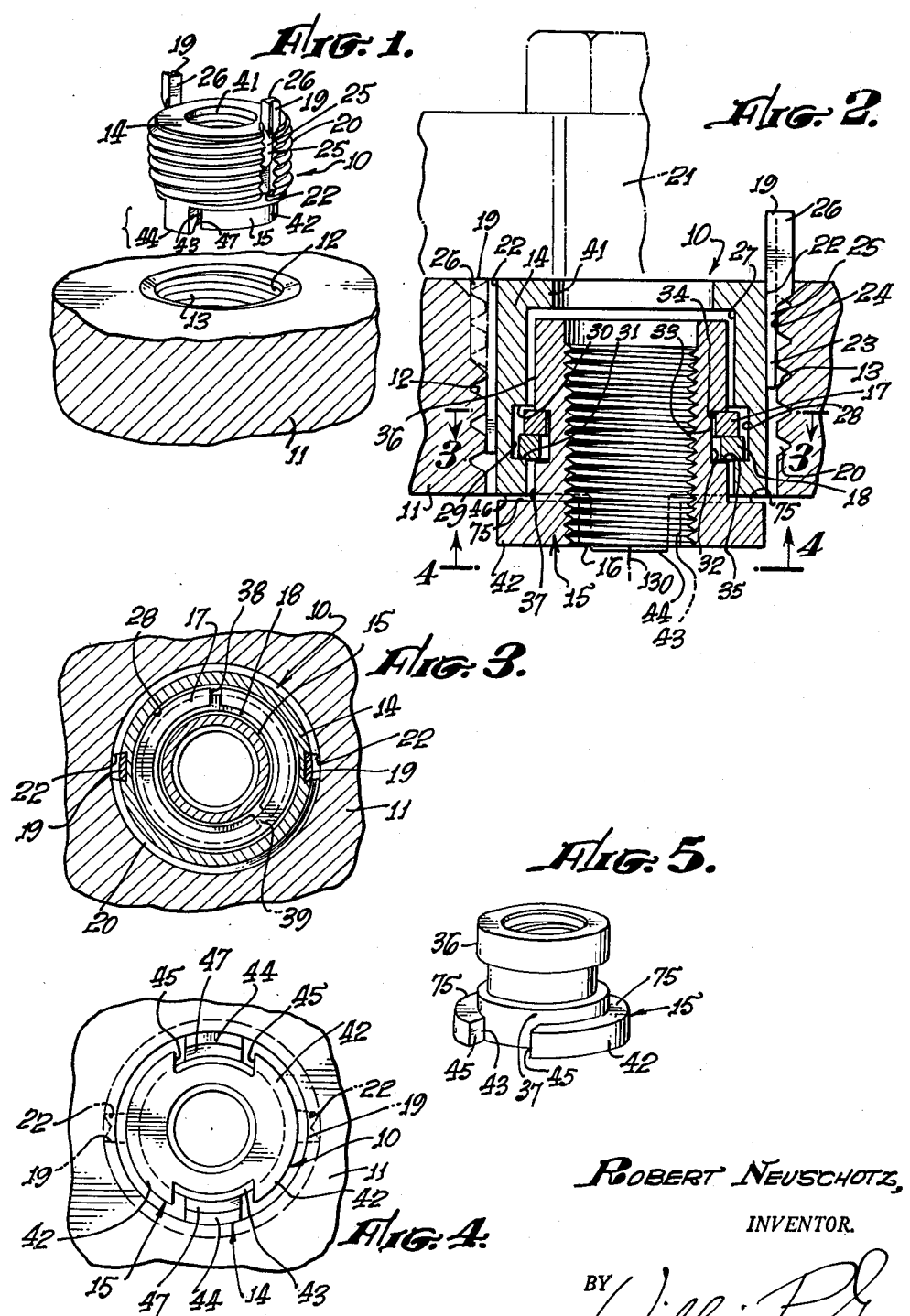
Robert Neuschotz,
INVENTOR.
BY William P. Green
ATTORNEY.

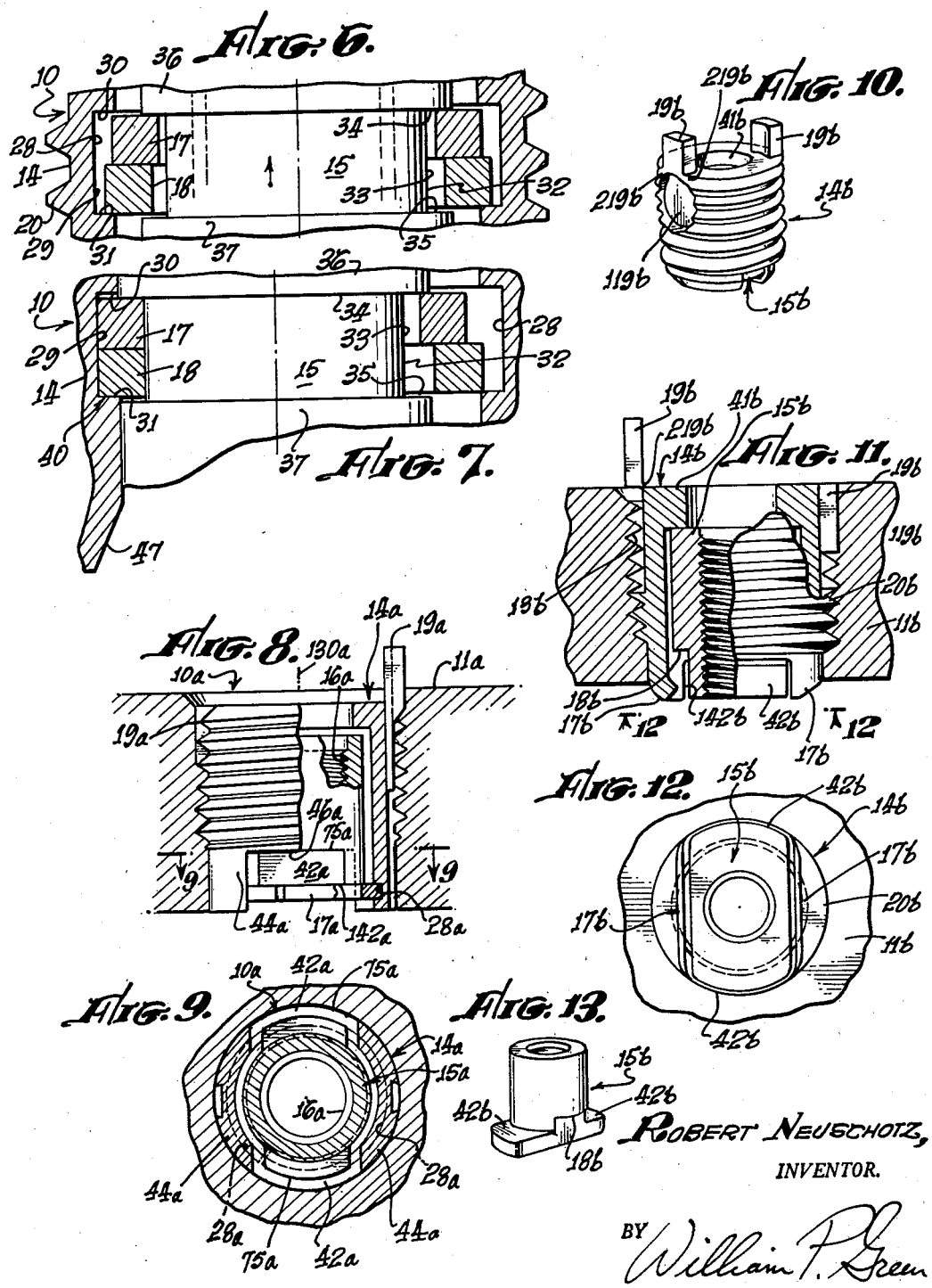

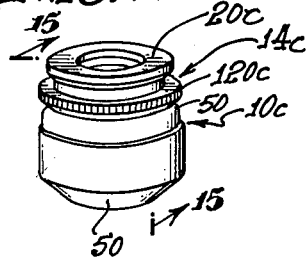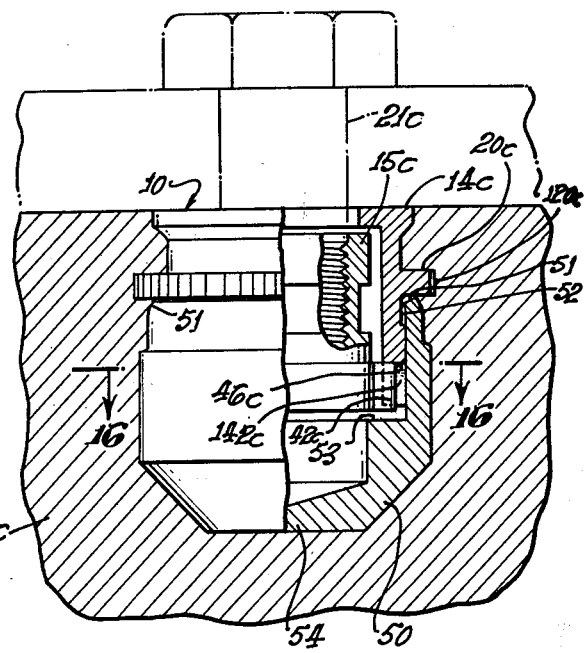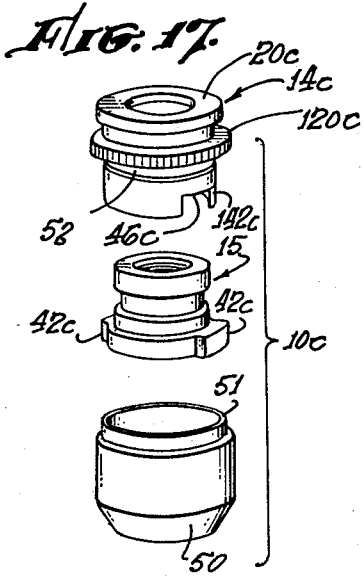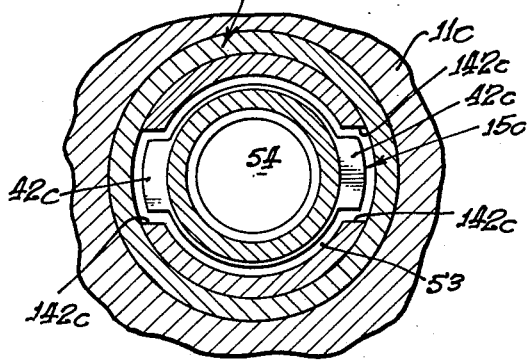
Robert Neuschotz,
INVENTOR.

United States Patent Office 3,130,765
Patented Apr. 28, 1964

1

3,130,765
SELF-ALIGNING THREADED INSERT WITH
RESILIENT RETAINING RING
Robert Neuschotz, 1162 Angelo Drive,
Beverly Hills, Calif.
Filed Apr. 14, 1959, Ser. No. 806,339
8 Claims. (Cl. 151—41.73)

This invention relates to improved threaded insert assemblies, of a type adapted to be mounted within a passage or bore in a main carrier part, and having internal threads into which an associated stud or bolt may be connected to attach the stud or bolt to the carrier part through the medium of the insert assembly.

In using threaded inserts of this general type, it is frequently very difficult to position the inserts so accurately within the carrier part as to assure completely precise alignment with an opening or passage in another part through which the stud or bolt is to pass. With this in mind, the general object of the present invention is to provide an insert assembly in which the stud engaging threads are formed in a part which is free for substantial lateral or transverse shifting movement, to thereby allow the threads to shift laterally into alignment with the coacting stud, even though the stud may not be aligned with the main axis of the overall insert assembly. In many instances in which it is not possible or practical to assure completely accurate alignment of a stud with the main axis of an insert structure, this self-aligning shifting movement of the present type of device has proven extremely helpful.

Structurally, an assembly constructed in accordance with the invention includes an outer essentially tubular section or shell, containing an inner internally threaded stud engaging section or part which is free for lateral shifting movement relative to the outer section. The outer tubular part is received directly within a passage or bore formed in the main carrier part, and engages that part within the passage in a relation holding the outer section in fixed position relative to the carrier part. For this purpose, the outer section has an external shoulder or shoulders which abut axially against the material of the carrier part in a manner transmitting axially outward load forces directly to that material. In certain preferred forms of the invention, this shoulder on the outer surface of the outer section takes the form of a screw thread, which extends helically along that outer surface and is adapted to be screwed into a similarly shaped thread formed within the interior of the passage in the carrier part. One or more locking keys may then be provided to lock the outer section against unscrewing rotary movement relative to the carrier part.

In another form of the invention, the outer section of the device is secured in fixed relation to the carrier part by actually casting the material of the carrier part about the insert assembly, so that the outer section of that assembly is embedded permanently and rigidly within the cast material (e.g. cast metal or molded resinous plastic material). In this case, the shoulder for preventing axially outward movement of the outer section of the assembly from the carrier part may take the form of an essentially annular shoulder, typically having a series of teeth formed thereon for preventing rotation of the assembly within the cast material.

Certain features of the present invention have to do with various structural aspects of the different forms of the invention, which have proven of considerable practical importance. One of these features resides in a preferred arrangement for retaining the inner section of the insert assembly against rotation relative to the outer section, and for transmitting axially outward load forces from the inner section to the outer section. In particular, I prefer for these purposes to provide the inner section with at least one, and preferably two, ears or lugs projecting essentially radially outwardly at or near the axially inner end of the inner section, and interfitting with the outer section at that location in a manner transmitting both rotary and axial forces between the two parts, while at the same time allowing the desired transverse shifting movement of the inner section relative to the outer section. Such transmission of axial load forces between the two parts at the axially inner end of the assembly, rather than at its axially outer end, eliminates the necessity for the provision of a relatively heavy and strong load transmission shoulder at the outer end of the assembly, which shoulder functions when present to very materially reduce the overall effectiveness of the insert assembly. More specifically, if it is necessary to provide a very thick and heavy load transmission shoulder at the axially outer end of the insert assembly, the presence of this shoulder necessitates the positioning of the stud engaging threads of the assembly at a location spaced relatively far axially inwardly from the outer end of the assembly. This inward spacing of the threads requires the use of a longer stud, and in many instances decreases the effectiveness of the threaded connection between the stud and the insert assembly.

An additional feature of the invention has to do with a very unique manner of transmitting axially inward forces from the inner section to the outer section of the assembly, to retain these two parts together. For this purpose, I prefer in most instances to employ one or more snap rings, which abut against shoulders formed on the two sections in a manner transmitting axial forces therebetween. An optimum arrangement is one in which two such snap rings are provided, partially received within two opposed grooves formed in the inner and outer sections of the assembly, with one snap ring desirably being slightly larger in diameter than the other.

The above and other features and objects of the present invention will be better understood from the following detailed description of the typical embodiments illustrated in the accompanying drawings in which:

FIG. 1 is a perspective view showing a first form of insert assembly constructed in accordance with the invention;

FIG. 2 is an enlarged section taken diametrically and axially through the FIG. 1 insert assembly;

FIG. 3 is a transverse section taken on line 3—3 of FIG. 2;

FIG. 4 is an inner end view of the insert assembly, taken on line 4—4 of FIG. 2;

FIG. 5 is a perspective view of the inner nut element of the device;

FIGS. 6 and 7 are greatly enlarged fragmentary sections showing the two snap rings in two different positions;

FIG. 8 is a view somewhat similar to FIG. 2, but showing a variational form of insert assembly embodying the invention;

FIG. 9 is a transverse section taken on line 9—9 of FIG. 8;

FIG. 10 is a perspective view of the device of FIGS. 8 and 9;

FIG. 11 is a view similar to FIG. 8, but showing another form of the invention;

FIG. 12 is an inner end view of the device of FIG. 11, taken on line 12—12 of that figure;

FIG. 13 is a perspective view of the inner nut element of the device of FIGS. 11 and 12;

FIG. 14 is a perspective view of a fourth device constructed in accordance with the invention;

FIG. 15 is an enlarged partly sectional view of the device of FIG. 14;

FIG. 16 is a transverse section taken on line 16—16 of FIG. 15; and

FIG. 17 is an exploded perspective view of the insert device shown in FIGS. 14 to 16.

With reference first to FIGS. 1 through 7, and particularly to FIG. 1, I have shown at 10 a first form of insert assembly constructed in accordance with the invention, and adapted to be connected into a carrier part or member 11. This carrier part 11 may typically be formed of a metal such as aluminum, or a resinous plastic material, or any other material into which it may be desirable to connect a threaded insert. Part 11 contains a bore 12, which may either extend entirely through the thickness of part 11, or only partially through the part to form a blind recess. The inner wall of bore 11 is internally threaded at 13, so that the insert assembly 10 may be screwed into the bore.

FIG. 2 shows insert assembly 10 as it appears after it has been screwed into threaded bore 12 in part 11, and after one of the two locking keys has been driven into its holding position. Referring to FIG. 2, the assembly 10 includes an outer essentially tubular section or element 14, an inner relatively movable essentially tubular section 15, two snap rings 17 and 18 for securing parts 14 and 15 together, and two locking keys 19. Outer section 14 has external threads 20 of a size and pitch corresponding to internal threads 13 in bore 12, so that the part 14 can be screwed into bore 12 to the fully installed position of FIG. 2. Inner part 15 contains internal threads 16 for receiving and threadedly engaging a threaded bolt 21 or other part with which assembly 10 is intended to coact.

The two keys 19 may be of the type disclosed and claimed in my Patent No. 2,855,970 issued October 14, 1958, on "Insert Having Frictionally Retained Key Which Upsets Threads of Base Member." These two keys are contained within two axially extending grooves 22 formed in the outer surface of part 14 at two diametrically opposite locations, which grooves extend into the material of part 14 to a depth 23 a substantial distance radially inwardly beyond the minor diameter portions 24 of threads 13. Grooves 22 have the dove-tail cross-sectional configuration represented in FIGS. 3 and 4, so that the keys 19 are effectively confined within the grooves and are guided thereby for only directly axial movement relative to part 14. Each key 19 has an axially inner portion 25 which is initially contained within groove 22, and an axially outer portion 26 projecting axially outwardly from and beyond the part 14. Portion 25 is sufficiently thin radially to be received entirely within the minor diameter 24 of teeth 13, so that this portion 25 does not interfere with the initial manual screwing of part 14 into bore 12. The outer portion 26 of the key is of an increased radial thickness, to project radially outwardly beyond the minor diameter 24 of teeth 13, so that when key 19 is driven axially from the position of the right hand key in FIG. 2 to the position of the left hand key, the portion 26 of the key acts to cut into and deform teeth 13 of part 11 in a manner positively locking part 14 against subsequent unscrewing rotary movement relative to part 11. Portions 25 of keys 19 are sufficiently tight fits within grooves 22 to frictionally hold the keys in the outwardly projecting positions of FIG. 1 relative to part 14 until the keys are forcibly driven to their locking positions. The cross-sectional configuration of the keys of course corresponds to grooves 22, to guide the keys for their axial movement. As is brought out clearly in FIG. 2, the threads 13 in part 11, and also threads 20 on part 14, desirably have their minor diameter modified substantially, so that the radial depth of the threads is as small as possible, consistent with the desired holding force, to leave a maximum amount of space for the other portions of unit 10.

Internally, part 14 has an inner cylindrical wall 27, which is interrupted at 28 by an annular groove extending radially outwardly into the material of part 14. Groove 28 has an outer wall 29 which is centered about the same axis 130 as are surface 27 and threads 13 and 20. At the opposite axial ends of wall 29, groove 28 has two transverse end walls 30 and 31.

The two previously mentioned snap rings 17 and 18 are adapted to be partially received within groove 28, and also to be partially received within a radially opposed annular groove 32 formed in the radially outer surface of part 15. Groove 32 is defined by an inner cylindrical wall 33, and two transverse end walls 34 and 35. At 36 and 37, part 15 is externally cylindrical. When part 15 is centered with respect to axis 130, surfaces 29, 36 and 37 are all centered about that axis, as are internal threads 16.

The diameter of surfaces 36 and 37 on part 15 is sufficiently smaller than the internal diameter of inner wall 27 of part 14 to allow part 15 to shift transversely of axis 130 relative to part 14 through a very substantial range of movement. This shifting movement is of course designed to allow inner nut element 15 to shift laterally for self aligning movement with respect to bolt or stud 21. Snap rings 17 and 18 are desirably of the square cross-sectional configuration represented in FIGS. 2, 6 and 7, and are of a diameter greater than cylindrical wall 33, and less than cylindrical wall 29, so that the rings are free for lateral shifting movement within these two grooves, as represented clearly in FIG. 7. Rings 17 and 18 are of a combined axial thickness almost equal to the axial dimension of the two grooves 28 and 32 within which they are received. Each of the rings 17 and 18 is interrupted at one point along its circumference (see 38 and 39 in FIG. 3), and the two rings 17 and 18 are formed of a resiliently deformable spring material, such as spring steel, which normally tends to return to the diameters illustrated for the rings in the figures, but which is forcibly deformable to a decreased diameter during assembly of the device. As indicated in the figures, and as best brought out in FIGS. 6 and 7, the axially inner snap ring 18 is normally of a slightly greater diameter than is snap ring 17. When all of the parts are centered about axis 130, the outer cylindrical surface of larger snap ring 18 is spaced a substantial distance outwardly beyond cylindrical surface 27 of part 14, so that the axially inner transverse surface of ring 18 is adapted to abut axially against wall 31 of groove 28. Similarly, the smaller ring 17 projects inwardly a substantial distance beyond the diameter of surfaces 36 and 37, to abut axially against the end wall 34 of groove 32.

In this way, rings 17 and 18 act to retain inner part 15 against axially inward withdrawal from part 14 (downwardly as seen in FIG. 2). This holding action of rings 17 and 18 is effective in any position to which part 15 may be shifted laterally relative to part 14, since in any such position, part 15 abuts axially against ring 17, and ring 18 abuts axially against part 14, and the two rings abut axially against one another. In the extreme laterally shifted position of FIG. 7, the two rings 17 and 18 have portions at one location 40 which are directly axially opposite one another, and which occupy and exactly fill the entire combined radial extent of the two grooves 28 and 32. To allow for this, the radial thickness of each of the rings 17 and 18 may substantially exactly equal the radial depth of groove 28 plus the radial depth of groove 32. The gaps 38 and 39 in the two rings 17 and 18 are sufficiently wide to allow for contraction of rings 17 and 18 to a condition in which they are entirely received within the diameter of cylindrical surface 27, to allow for assembly of the device.

At its axially outer end, part 14 may have an inturned annular flange 41, having an opening large enough to pass screw 21 into threads 16 in any of the positions to which part 15 may be laterally shifted. This flange 41 however is desirably not a load bearing flange. Instead, the axially outward forces exerted against part 15 by bolt 21 are preferably taken by part 14 at its axially inner end. For this purpose, part 15 has a radially outwardly projecting transverse flange 42 at its axially inner end, which may be annular except for the provision of two diametrically opposed notches or cut-away areas 43. Within these cut away-areas 43, part 14 has two axially inwardly projecting ears or lugs 44, against which side walls 45 of cut-aways 43 are adapted to abut in a manner retaining inner part 15 against rotation relative to outer section 14. However, as is seen clearly in FIG. 4, the lugs 44 are dimensioned to be loose enough fits within cut-aways 43 to allow for the full range of lateral shifting movement of part 15 relative to part 14, while still maintaining the inner section 15 against relative rotation. Circularly between the two lugs or ears 44, part 14 has an axially inner transverse end wall 46, against which the upper transverse surfaces 75 of the two halves of flange 42 abut axially to transmit axially outward load forces from part 15 to part 14.

In assembling the insert structure 10, the two snap rings 17 and 18 may first be expanded slightly and then slipped onto the outer surface of part 15, and into groove 32. The assembly thus formed can then be slipped axially into part 14, with the rings 17 and 18 being slightly constricted, until these rings snap into and are retained within groove 28 of part 14. In order to facilitate the constriction of the rings, lugs 44 may have inner tapering surfaces 47 adapted to cam rings 17 and 18 to the reduced diameter of surface 27, as a result of the inserting movement of the rings and their carrier part 15 into outer section 14.

After unit 10 has been completely assembled, it can be easily screwed into threaded bore 12 to the position of FIG. 2, following which the two keys 19 are driven axially to the position of the left hand key in FIG. 2, to lock outer section 14 of the insert assembly in completely fixed position relative to part 11. Bolt 21 can then be screwed into inner nut element 15 of the insert assembly, and during such insertion, the inner nut element will automatically shift laterally relative to outer section 14 to a position in which part 15 is in proper alignment with the coacting bolt 21. In any position to which part 15 is shifted, the axially outward load forces will be transmitted very effectively to part 14 by engagement of the two lugs formed by flange 42 with inner end surfaces 46 of part 14. Such transmission of these load forces to part 14 at its inner end rather than its outer end is highly desirable, since it eliminates the necessity for making flange 41 at the outer end of part 14 thick enough and strong enough to take those load forces. As a matter of fact, flange 41 may be so positioned that it is never contacted by part 15. If, on the other hand, the device were so designed that these outward load forces were taken by shoulder 41, then that shoulder would have to be considerably thicker axially, with the result that bolt 21 would have to project into the insert assembly considerably farther before it reached the point of engagement with internal threads 16 of part 15. In many situations, this is a very decided disadvantage.

In any position to which the part 15 is shifted laterally, rings 17 and 18 act to retain part 15 against axially inward withdrawal from part 14. It is also noted that the provision of two rings, rather than a single ring, allows for a greater range of lateral shifting movement of part 15. This is true because, if a single ring were employed, that ring should be of a somewhat greater radial thickness than either of the two rings illustrated, in which case the parts obviously could not shift laterally to the extreme position represented in FIG. 7. The increased thickness ring would prevent movement to this extreme position.

FIGS. 8 and 9 show a second form of the invention which is essentially very similar to that of FIGS. 1 through 7, except for the manner of retention of inner nut element 15a against axially inward withdrawal from outer section 14a. As in the first form, outer section 14a has two diametrically opposed axially inwardly projecting lugs 44a (which in this case are arcuate and of somewhat greater circular extent than in FIGS. 1–7), and between which there are received two lugs 42a projecting laterally outwardly from part 15a. Part 15a is retained by means of a resilient split snap ring 17a, which is received within two arcuate grooves 28a formed in the inner cylindrical surface 27a of part 14a at a location near the ends of lugs 44a. These two grooves 28a are both centered about the same axis 130a, and form in effect two segments of a single annular groove, which is interrupted at the cutaway locations circularly between lugs 44a. Ring 17a is urged by its own resilience radially outwardly against the outer walls of grooves 28a, to thereby be retained in fixed position relative to part 14a. The outer end surfaces 142a of the two laterally projecting lugs 42a formed on part 15a abut axially against ring 17a, as do certain portions of the end surfaces of part 15a circularly between lugs 42a, to hold part 15a against axially inward removal. Part 15a is free for lateral shifting movement relative to part 14a, since outer cylindrical surface 36a of part 15a is considerably smaller in diameter than surface 27a of part 14a. Also, as seen in FIG. 9, lugs 42a are loose enough within the cut-aways formed between lugs 44a to permit the desired lateral shifting movement, while still retaining part 15a against rotation by virtue of the interengagement of lugs 42a and 44a.

As in the first form of the invention, the axially outward load forces are transmitted from inner part 15a to outer part 14a by virtue of the engagement of transverse surfaces 75a on lugs 42a against transverse surfaces 46a formed on part 14a. Also, part 15a is of course externally threaded at 20a for engagement with the internal threads in part 11a, and part 15a is internally threaded at 16a for engagement with a coacting stud or bolt. Keys 19a are provided for locking outer section 14a of the insert assembly in fixed position relative to part 11a.

The third form of insert assembly shown in FIGS. 10 through 13 includes an outer section 14b which is externally threaded at 20b for attachment into a threaded bore within part 11b. In this form of the invention, the two keys 19b are initially formed integrally with the material of part 14b, with circular recesses 119b being formed in the outer surface of part 14b at locations directly axially inwardly of and opposite keys 19b, so that the keys may be driven axially into those recesses 119b, to deform the material of threads 13b in part 11b, and thus lock part 14b in fixed position relative to part 11b. When one of the keys 19b is driven axially from its initial outwardly projecting position to the locking position of the right hand key in FIG. 11, such driving movement acts to shear the material of the key at the locations 219b at which it is integrally connected to the rest of part 14b. This shearing action then frees the key for its axially inward movement into the associated recess 119b, to lock part 14b in its installed position. Recess 119b is purposely formed close enough to key 19b to leave very small cross-sections of the material of part 14b at the points at which each key 19b is integrally attached thereto, to thus allow for the shearing action.

In the device of FIGS. 10 through 13, it is assumed that the end use of the item will allow for the provision of a relatively thick load bearing flange 41b on part 14b at its axially outer end. The inner section 15b then abuts directly against this flange 41b. Inner part 15b is again sufficiently loose within section 14b to allow for a substantial amount of lateral shifting movement of part 15b, to attain a self-aligning action with respect to a coacting stud or bolt. At its axially inner end, part 15b has two diametrically opposed laterally projecting lugs or flange elements 42b, which project laterally outwardly into cut-aways or notches 142b formed in the side wall of part 14b, to engage laterally against the sides of those cutaways in a manner preventing rotation of part 15b relative to outer section 14b. The lugs 42b are, however, sufficiently loose within cut-aways 142b to allow for the full desired range of lateral shifting movement of part 15b relative to part 14b, and in any desired transverse direction. Circularly between the two cut-aways 142b, the material of the side wall of tubular part 14b is crimped radially inwardly at two diametrically opposite locations 17b, to be engageable with transverse shoulders 18b formed on part 15b in a manner locking part 15b axainst axially inward withdrawal from part 14b. As is seen clearly in FIG. 12, these crimped portions of the side wall of part 14b are not deformed inwardly far enough to interfere with the desired lateral shifting movement of part 15b.

The final form of the invention, represented in FIGS. 14 through 17, is a form of self aligning insert assembly 10c which is adapted to be cast into a carrier part 11c, rather than being screwed into that part. In this arrangement, the outer section 14c of assembly 10c has a radially outwardly projecting shoulder or flange 20c, having a series of circularly spaced radially outwardly projecting teeth 120c embedded within the material of part 11c to prevent rotation of element 14c relative thereto. As will be apparent, the engagement of flange 20c with the material of part 11c also effectively prevents axially outward (upward) movement of part 14c from within the recess or bore within which it is confined.

Inner nut element 15c is again free for substantial lateral shifting movement relative to part 14c, for self alignment with bolt 21c. Also, part 15c has at its axially inner end a pair of diametrically opposed radially outwardly projecting lugs or flange elements 42c, which are received within cut-away areas 142c in part 14c in a relation preventing rotation of part 15c, while at the same time leaving element 15c free for its lateral shifting movement in any direction. Lugs 42c abut axially outwardly against surfaces 46c formed on part 14c to transmit axially outward load forces from part 15c to outer section 14c.

Section 15c is in this instance retained against inward withdrawal from part 14c by means of a cup shaped member 50, which is annularly crimped radially inwardly about its upper edge 51 and into a shallow groove 52 formed in part 14c, to secure parts 14c and 50 rigidly together. Member 50 has a transverse annular shoulder 53 formed within its interior, and against which flanges 42c of part 15c can abut, to block axially inward withdrawal of part 15c. The member 50 preferably extends entirely across and closes the axially inner end of parts 14c and 15c, at 54.

To install the assembly 10c of FIGS. 14 through 17, the first step is of course to assemble parts 14c, 15c, and 50 together, and to hold them in their assembled relation by crimping part 50 at 51. The assembly 10c is then cast directly within the part 11c, when that part is manufactured. For example, part 11c may be an aluminum casting, or a part molded from resinous plastic material, so that when the aluminum or plastic material hardens about assembly 10c, that assembly is effectively locked in fixed position relative thereto. As in the other forms of the invention, part 15c shifts laterally in a self-aligning manner into a proper position for engagement with bolt 21c, as that bolt is inserted into the assembly.

I claim:
1. A self-aligning fastener assembly comprising an outer hollow body section adapted to be mounted to a carrier part, an inner nut section carried within said outer section and containing internal threads into which a coacting stud is threadedly connectible, said inner section being free for limited lateral self-aligning movement transversely of its axis relative to said outer section, said inner section having a lug projecting radially outwardly therefrom near its axially inner end, said outer section containing a recess into which said lug projects radially outwardly, said recess having a side wall engageable by the lug in a relation to retain the inner section against rotation relative to the outer section, said recess having an end wall against which said lug abuts axially outwardly to transmit axially outward load forces from the inner section to the outer section, said two sections having opposed grooves facing radially toward one another at a location axially outwardly beyond said lug and radially opposite said internal threads, and two floating resilient snap rings abutting axially against one another and partially received within said grooves and adapted to transmit axially inward forces from said inner section to the outer section while allowing said self-aligning movement of the inner section, said snap rings being loose enough in said grooves to be shiftable transversely relative to each section, one of said rings abutting axially inwardly against said outer section, and the other ring being of a smaller diameter and abutting axially outwardly against the inner section.

2. An assembly as recited in claim 1, in which said outer section has external threads and is adapted to be screwed into a threaded passage in said carrier part.

3. A self-aligning insert comprising a hollow tubular body adapted to be mounted in a carrier part, a relatively shiftable nut element having an essentially tubular portion disposed within said body and containing internal threads into which a coacting stud is threadedly connectible from a predetermined axially outer end thereof, radially projecting lug means formed on said nut element at the axially inner end of, and projecting radially outwardly farther than, said tubular portion and defining axially outwardly open recess means in said nut element, axially inwardly projecting lug means formed on said body and engaged in said nut element recess means and defining axially inwardly open recess means having said radially projecting lug means engaged therein, the tubular portion of said nut element having an exterior diameter less than the interior diameter of said body and each of said lug means having a greatest circumferential dimension less than that of the recess means receiving the same to allow limited transverse shifting movement and limited rotary movement of the nut element with respect to said body when the nut element and body are in a predetermined operative position, said body having axially inwardly facing surface means formed integrally thereon, said nut element having axially outwardly facing surface means formed integrally thereon which are in one position spaced from but in said operative position located to engage said inwardly facing surface means to transmit axially outward load forces imparted by the stud from said nut element to said body, said nut element having an exterior essentially annular groove formed therein axially outwardly beyond said radially projecting lug means, said body having an interior essentially annular groove formed therein radially opposite said exterior groove in said operative position, and resilient snap ring means received partially radially within each of said grooves, said exterior and interior grooves having axially inwardly and axially outwardly facing shoulder portions, said inwardly facing shoulder portion of said nut groove and said outwardly facing shoulder portion of said body groove being engageable with said snap ring means in a relation preventing axially inward separation of said nut element from said body, when said ring means is engaged with said last mentioned shoulder portions the total clearance between said ring means and said inwardly facing shoulder portion of the body groove and said outwardly facing shoulder portion of the nut groove being at least as great as the space between said inwardly and outwardly facing surface means, said snap ring means being resiliently radially distortable upon insertion of said nut element into said body to said operative position to pass said snap ring means into said grooves, there being sufficient clearance between said body and said nut element and between at least one of them and said snap ring means to permit said limited relative transverse and rotary movements of said nut element.

4. A self-aligning insert as defined in claim 3, wherein said axially inwardly facing surface means defines a portion of said axially inwardly open recess means in said body and wherein said axially outwardly facing surface means is formed on the lug means of said nut element.

5. A self-aligning insert as defined in claim 3, wherein said body includes external threads formed thereon adapted to cooperatively engage with internal threads formed in the carrier part, said body also having an axial groove formed in the exterior periphery thereof radially inwardly of said external threads, and a key mounted within the axially outer end of said groove, said key including a thread interrupting portion extending axially outwardly of said body and operable to be driven axially inwardly within said axial groove when said body is threaded within the carrier part to interrupt the internal threads of the part and fixedly lock said body therein.

6. A self-aligning insert as defined in claim 3, wherein said snap ring means comprises a pair of split rings each of a radial thickness sufficient to be engaged within said exterior annular groove and pass interiorly within said hollow body when resiliently radially inwardly distorted, one of said rings having a non-deformed size greater than the non-deformed size of the other ring.

7. A self-aligning insert as defined in claim 3, wherein said radially projecting lug means comprises a pair of arcuate flange portions, adjacent ends of said flange portions being spaced apart and defining with the adjacent tubular portion said axially outwardly open recess means.

8. A self-aligning insert as defined in claim 7, wherein said axially inwardly facing surface means defines a portion of said axially inwardly open recess means in said body and wherein said axially outwardly facing surface means is formed on said pair of arcuate flange portions.

References Cited in the file of this patent

UNITED STATES PATENTS

| | | |
|---|---|---|
| 1,197,052 | Newhall | Sept. 5, 1916 |
| 2,455,145 | Swanstrom | Nov. 30, 1948 |
| 2,577,009 | Frantz | Dec. 4, 1951 |
| 2,639,179 | Phelps | May 19, 1953 |
| 2,777,154 | Kircher et al. | Jan. 15, 1957 |
| 2,815,058 | Neuschotz | Dec. 3, 1957 |
| 2,827,097 | Nuss | Mar. 18, 1958 |
| 2,855,970 | Neuschotz | Oct. 14, 1958 |
| 2,907,418 | Hudson et al. | Oct. 6, 1959 |
| 2,972,367 | Woolton | Feb. 21, 1961 |